United States Patent
Ohya et al.

(10) Patent No.: US 8,672,622 B2
(45) Date of Patent: Mar. 18, 2014

(54) FLUID MACHINE, WIND TURBINE, AND METHOD FOR INCREASING VELOCITY OF INTERNAL FLOW OF FLUID MACHINE, UTILIZING UNSTEADY FLOW

(75) Inventors: Yuji Ohya, Fukuoaka (JP); Takashi Karasudani, Fukuoka (JP); Kimihiko Watanabe, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 798 days.

(21) Appl. No.: 12/743,148

(22) PCT Filed: Nov. 5, 2008

(86) PCT No.: PCT/JP2008/003187
§ 371 (c)(1),
(2), (4) Date: May 14, 2010

(87) PCT Pub. No.: WO2009/063599
PCT Pub. Date: May 22, 2009

(65) Prior Publication Data
US 2011/0042952 A1 Feb. 24, 2011

(30) Foreign Application Priority Data
Nov. 15, 2007 (JP) ................. 2007-297107

(51) Int. Cl.
*F03D 1/04* (2006.01)
(52) U.S. Cl.
USPC ................................................ 415/208.1
(58) Field of Classification Search
USPC .......... 415/4.3, 4.5, 220, 222, 223, 908, 914, 415/2.1, 126, 140, 208.2, 208.3, 208.5; 416/192, 179
See application file for complete search history.

(56) References Cited

U.S. PATENT DOCUMENTS 6,168,373 B1 * 1/2001 Vauthier ........................ 415/7
6,756,696 B2 * 6/2004 Ohya et al. .................. 290/55
(Continued)

FOREIGN PATENT DOCUMENTS

| JP | 2002-213343 A | 7/2002 |
| JP | 2003-328922 A | 11/2003 |

(Continued)

OTHER PUBLICATIONS

Extended European Search Report, dated Aug. 1, 2013, issued by the European Patent Office in counterpart European Application No. 08849447.1.

*Primary Examiner* — Nathaniel Wiehe
*Assistant Examiner* — Jeffrey A Brownson
(74) *Attorney, Agent, or Firm* — Sughrue Mion, PLLC

(57) ABSTRACT

A fluid machine includes a non-streamline casing capable of forming a stable vortex street on a downstream side by internal and external flows, and an impeller disposed inside the casing. The casing has a vortex generator configured to form the vortex street on the downstream side. The vortex generator is provided with a phase control structure which regulates a phase of a vortex formation that fluctuates along a circumferential direction in a plane including a rear face of the casing and which clarifies a cell structure to be formed along the circumferential direction of the casing to fix, on a surface of the casing, respective positions of cells into a plurality of segmented regions arranged in the circumferential direction. The velocity of the internal flow is increased by the phase control structure.

13 Claims, 10 Drawing Sheets

(56) References Cited

U.S. PATENT DOCUMENTS

2003/0178856 A1 9/2003 Ohya et al.
2004/0042894 A1 3/2004 Smith
2007/0207028 A1* 9/2007 Nicholas et al. ............... 415/3.1

FOREIGN PATENT DOCUMENTS

| JP | 03-621975 B2 | | 12/2004 | |
| JP | 2007-046574 A | | 2/2007 | |
| WO | WO 03025385 | * | 3/2003 | ............... F03B 1/00 |

* cited by examiner

NO PLATES
(a)

6 PLATES
(b)

12 PLATES
(c)

24 PLATES
(d)

(a)

(b)

(a)

(b)

(a)

(b)

FLUID MACHINE, WIND TURBINE, AND METHOD FOR INCREASING VELOCITY OF INTERNAL FLOW OF FLUID MACHINE, UTILIZING UNSTEADY FLOW

TECHNICAL FIELD

The present invention relates to fluid machine which utilizes an unsteady flow and is operated with internal and external flows, a wind turbine which generates electricity with high output by increasing a velocity of an internal flow caused by a wind in the atmosphere, and a method for increasing a velocity of an internal flow of the fluid machine.

BACKGROUND ART

Global warming and other global environmental problems as well as an energy problem that energy resources, such as oil that have been misunderstood to be unlimited, are starting to run out, are recently becoming a global common awareness.

Under such a circumstance, wind power generation, which is free from $CO_2$ emission, is in the limelight as energy generating means that solves both the environmental problems and the energy problem. However, wind power generators can convert merely about 40% of kinetic energy of wind flowing inside the wind turbine into electric power, even with large-sized wind turbines which are regarded as being highly-efficient. If an amount of conversion is improved, the wind power generation will be in a more dominant position in relation to the environmental problems and the energy problem.

In the meantime, the output of the wind power generation is proportional to a cube of a wind velocity. Therefore, when installing a wind turbine, a windy area is selected as a site. Further, efforts have been made to collect wind to increase velocity as much as possible so as to increase power generation. Accordingly, attention has been paid to an improvement in a wind collecting element on an intake side of a wind power generator, an impeller, a diffuser, and the like, and measures have been taken to improve energy conversion efficiency as much as possible. However, these considerations and measures are all an extension of conventional turbo machine. As a matter of course, there has been a limit.

In view thereof, the inventors and other researchers have challenged such common sense in the wind power generators (see Patent Document 1). Specifically, they reached a viewpoint that it is not necessary to be bound by a streamline shape and a steady-flow way of thinking, as long as an objective of high output power generation can be achieved. Conventional fluid machines are based on a streamline shape and a steady-flow that are easy to analyze, and it is not an exaggeration to say that there are no turbo machines that utilize a non-streamline shape (a bluff body) and an unsteady flow. However, even with a non-streamline shape and an unsteady flow, the original objective is fulfilled if it possible to realize a steady-flow and to increase flow velocity of an internal flow than the conventional flow so that the flow is improved. The "streamline shape" and the "non-streamline shape" are defined hereinbelow. The streamline shape is a shape according to which a flow streams without substantially separating from an object surface within a range of Reynolds numbers Re used in fluid machines, while the non-streamline shape is a shape other than that according to which the separation occurs.

In order to achieve this, the inventors et al. have proposed a wind power generator of Patent Document 1. This wind power generator has a cylindrical wind tunnel body and a power-generating wind turbine disposed in near a wind inlet of the wind tunnel body. The wind power generator has a structure in which a flat flange perpendicular to a flow direction of wind is arranged on an outer side of an edge of an outlet of the wind tunnel body to cause a wind flowing outside the wind tunnel body to collide therewith so as to form intensive vortices on the back side, and in which an inclination angle of a side body portion with respect to an axis of the wind tunnel body is within a range of 5° to 25°. The flange has a width that is 10% to 100% of the minimum inner diameter of the wind tunnel body.

Forming vortices against the flow by placing such a flange (a ring) is beyond common sense in the conventional fluid machines. The vortices formed behind the flange are vortex formation which may be referred to as so called Kerman vortices that are generated alternately at inner and outer circumferences on a downstream side of a concentric ring. The vortices are alternately (in an unsteady manner) generated at certain timings, and the vortices reduce the pressure in the vicinity of the outlet of the wind tunnel body, whereby the flow velocity of the internal flow is improved due to pressure difference.

The structure of this wind power generator, in other words, created a new category (a type of fluid machine having a non-streamline shape) in the wind power generators or in the fluid machines. The structure controls the entire flow around the fluid machine by means of the vortices generated on the outlet side, to take stronger wind into the interior of the machine, and to efficiently speed up the fluid by causing the fluid to smoothly flow along an inner wall surface toward the outlet without separation from the inner wall surface. This speeded-up flow enables power generation with higher output than before.

Patent Document 1: JP 3621975 B2

DISCLOSURE OF THE INVENTION

Problem that the Invention is to Solve

However, the wind power generator of Patent Document 1 merely proposed an embryonic concept to provide a vertical flat flange on the outer side of the outlet of the wind tunnel body so as to cause the wind flowing outside the wind tunnel body to collide and to generate intensive vortices on the back side. From the viewpoint of stream control, the technique of the fluid machine having a non-streamline shape, i.e. non-streamline-shaped fluid machine, is still an ore. That is, the technique of Patent Document 1 leaves the flow to take its own course.

In order to further progress as promising fluid machine, it is necessary to further explore the nature of flow around a non-streamline shape and to elucidate the characteristics of the flow so as to enhance practical utility. As a first step, it is necessary to sufficiently stabilize flows of a vortex street (i.e., an unsteady flow) around a non-streamline shape. Difficulty in developing this technique can readily be inferred from the fact that, in fluid mechanics, a vortex is a phenomenon in which nonlinearity appears most noticeably (i.e., difficult to predict).

Accordingly, while the wind power generator of Patent Document 1 is superficially similar to conventional turbo machines, it is essentially different from the conventional turbo machines. And, in order to make use of this new wind power generator having a non-streamline shape, in other words, a wind turbine and also a fluid machine, in the future, a technique to stabilize the flow, the vortices is indispensable.

However, such a technique is similar to but different from a boundary layer control technique or straightening vanes that have hitherto been known. The boundary layer control technique or the straightening vanes are intended to prevent separation of a boundary layer from a surface of an object. On the other hand, what is required for the wind power generator, the wind turbine and the fluid machine is not a prevention of separation, but a sufficient separation of the flow and a control to order and to stabilize the entire flow associated with the generation of vortices. The technique is not to prevent vortices but, conversely, to generate vortices and to control the resulting flow.

Therefore, this technique functions when combined with a non-streamline object or a vortex generator, but not with a streamline wind tunnel body (object). It is true that the total fluid resistance received by a non-streamline object is greater, and this disadvantage usually greatly matters. However, when there is another objective such as increasing an output to be used for another, for instance, another objective such as converting wind power energy into electricity as in a wind power generator, the fluid machine should be selectively used depending on the objective in order to achieve its intended purpose.

When the Reynolds number Re increases, a surface flow along the non-streamline object usually separates on a downstream side. However, such separations do not neatly take place along a circumferential line perpendicular to the flow, and involve strong and weak fluctuations in terms of a scale of vortex generation of a vortex such that a separation at a strong fluctuation positions causes generates an intensive vortex. The flow around the non-streamline object cannot be utilized unless the entire flow involving such vortices is stabilized. Thus, a technique for stabilizing a flow of a vortex street by controlling the fluctuations is required.

Currently, wind power generators are being urged to increase in its size. When the wind power generator of Patent Document 1 is increased in size, the wind tunnel body (the diffuser) becomes longer (an inclination angle ranges from 5° to 25°) and increases in weight. In a case of a micro-wind turbine or a mini-wind turbine whose impeller has a diameter of several meters or less, this is a permissible weigh. However, in a case of a large-size wind power generator having MW-class power generation capacity whose future development is being planned, the diameter of an impeller is planned to be ten meters to several tens of meters, which would result in an impermissible weight with the previously-proposed diffuser. When increasing a size up to a MW-class, downsizing of a wind tunnel body is unavoidable.

Accordingly, an object of the present invention is to provide a fluid machine that utilizes an unsteady flow, can stabilize a flow involving a vortex street, increases a velocity of a fluid flowing in, has a short flow passage length, and has high energy conversion efficiency.

It is also an object of the present invention to provide a wind turbine that can stabilize a flow involving a vortex street, increases a velocity of a wind flowing in, has a short flow passage length, can be increased in size, and can perform power generation with high output.

Further, it is an object of the present invention to provide a method for increasing a velocity of an internal flow of a fluid machine that can stabilize a flow involving a vortex street, and increases a flow velocity of the internal flow by means of a flow on an outer side of the fluid machine.

A fluid machine of the present invention that utilizes an unsteady flow includes a non-streamline casing capable of forming a stable vortex street on a downstream side from internal and external flows and an impeller disposed inside the casing, and is characterized in that the casing has a vortex generator for forming the vortex street on the downstream side, the vortex generator is provided with a phase control structure which regulates, in a plane including a rear end face of the casing, a phase of a vortex formation that fluctuates along a circumferential direction within the plane including the rear end face, and which clarifies a cell structure to be formed along the circumferential direction of the casing to fix, on a surface of the casing, positions of respective cells into a plurality of segmented regions arranged within the plane including the rear end face, and the phase control structure increases a velocity of the internal flow.

A wind turbine of the present invention includes a non-streamline wind tunnel body capable of forming a stable vortex street on a downstream side from internal and external atmospheric flows and an impeller disposed inside the wind tunnel body, and is characterized in that the wind tunnel body has a vortex generator for forming the vortex street on the downstream side, the vortex generator is provided with a phase control structure which regulates, in a plane including a rear end face of the wind tunnel body, a phase of a vortex formation that fluctuates along a circumferential direction within the plane including the rear end face, and which clarifies a cell structure to be formed along the circumferential direction of the wind tunnel body to fix, on a surface of the wind tunnel body, positions of respective cells into a plurality of segmented regions arranged in the circumferential direction, and the phase control structure increases a velocity of the internal flow.

A method of the present invention for increasing a velocity of an internal flow of a fluid machine includes forming a stable vortex street from internal and external flows on a downstream side when the internal and external flows run inside and outside a non-streamline casing, and increasing the velocity of the internal flow running through the casing by reducing pressure on the downstream side due to the forming of the vortex street, and is characterized by including regulating, in a plane including a rear end face of the non-streamline casing, a phase of a vortex formation that fluctuates along a circumferential direction within the plane including the rear end face, and clarifying a cell structure to be formed in the circumferential direction of the casing to fix, on a surface of the casing, positions of respective cells into a plurality of segmented regions arranged within the plane including the rear end face and to stabilize the flow, wherein the velocity of the internal flow is increased due to the stabilization.

According to a fluid machine of the present invention that utilizes an unsteady flow, a flow involving a vortex street can be stabilized, a velocity of a fluid flowing in can, be increased, a size can be increased with a short diffuser length, and can improve energy conversion efficiency.

According to a wind turbine of the present invention, a flow involving a vortex street can be stabilized, a velocity of a wind flowing in can be increased, a size can be increased with a short flow passage length, and can perform power generation with high output.

According to a method of the present invention for increasing a velocity of an internal flow of a fluid machine, a flow involving a vortex street can be stabilized, and a flow velocity of the internal flow can be increased by means of a flow on an outer side of the fluid machine.

BRIEF DESCRIPTION OF THE DRAWINGS

FIG. 2 is an explanatory view of internal and external flows around a fluid machine according to the first embodiment of the present invention, utilizing an unsteady flow and having the flanged wind tunnel body and that;

DESCRIPTIONS OF THE REFERENCE SIGNS

Figure 1:
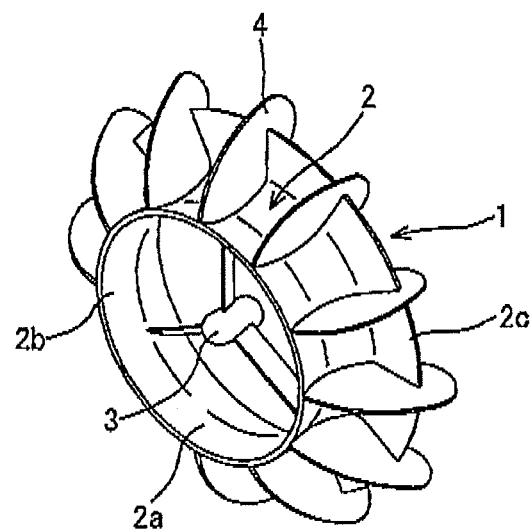
FIG. 1 is a perspective view of a wind power generator according to a first embodiment of the present invention, having phase control plates and a flanged wind tunnel body.

1 Wind Power Generator
2 Wind Tunnel Body
2a Throat
2b Inlet
2c Vortex Generator
3 Impeller
4 Phase Control Plate
10 Power Generating System
11 Electric Generator
12 AC/DC Converter
13 Battery Charger
14 Battery
15 DC/AC Converter
16 Power System
17 Controller
18 Actuator
18a Locking Part
19 Transmission Mechanism
20 Gap Detector
22 Support Base
23 Casing
31 Tidal Power Generator
h Radial Height of Vortex Generator
d Throat Diameter
$d_c$ Cylinder Diameter
D Projected Width
S, S' Cell
$P_n$ Vortex Generation Dominant Zone

BEST MODE FOR IMPLEMENTING THE INVENTION

A first aspect of the present invention is directed to a fluid machine which utilizes an unsteady flow, and having a non-streamline casing capable of forming a stable vortex street on a downstream side from internal and external flows and an impeller disposed inside the casing, characterized in that the casing has a vortex generator for forming the vortex street on the downstream side, the vortex generator is provided with a phase control structure which regulates, in a plane including a rear end face of the casing, a phase of a vortex formation that fluctuates along a circumferential direction within the plane including the rear end face, and which clarifies a cell structure to be formed along the circumferential direction of the casing to fix, on a surface of the casing, positions of respective cells into a plurality of segmented regions arranged within the plane including the rear end face, and the phase control structure increases a velocity of the internal flow. This configuration makes it possible to stabilize a flow involving a vortex street, to increase a velocity of the fluid flowing in, to enable an increase in size with a short length of diffuser, and to increase an energy conversion rate.

A second aspect of the present invention is dependent from the first aspect, and is directed to the fluid machine which utilizes the unsteady flow, characterized in that the phase control structure regulates, in the plane including the rear end face of the casing, the phase of the vortex formation that fluctuates in the circumferential direction within the plane including the rear end face, clarifies the cell structure to be formed along the circumferential direction of the casing to fix, on the surface of the casing, the positions of the respective cells into the plurality of segmented regions arranged within the plane including the rear end face, shifts on a segmented region basis a vortex generation dominant region among the segmented regions to which the cells are fixed, and increases the velocity of the internal flow. This configuration makes it possible to stabilize the flow involving the vortex street, to increase the velocity of the fluid flowing in, to enable an increase in size with a short length of diffuser, and to increase an energy conversion rate.

A third aspect of the present invention is dependent from the first or second aspect, and is directed to the fluid machine which utilizes the unsteady flow, characterized in that the phase control structure includes phase control plates arranged such that the number of the phase control plates is the same as or an integral submultiple of the number of the cells of the cell structure spontaneously formed on the casing by the flow. This configuration makes it possible to make the flow involving the vortex street most stable or substantially most stable, to increase the velocity of the fluid flowing in, to enable an increase in size with a short length of diffuser, and to increase an energy conversion rate. Needless to say, the integral submultiple is a discrete integer.

A fourth aspect of the present invention is dependent from the first or second aspect, and is directed to the fluid machine which utilizes the unsteady flow, characterized in that the number of the segmented regions formed by the phase control structure is the same as or an integral submultiple of the number of the cells of the cell structure spontaneously formed on the casing by the flow. This configuration makes it possible to make the flow involving the vortex street most stable or substantially most stable, to increase the velocity of the fluid flowing in, to enable an increase in size with a short length of diffuser, and to increase an energy conversion rate. Needless to say, the integral submultiple is a discrete integer.

A fifth aspect of the present invention is dependent from the first or second aspect, and is directed to the fluid machine which utilizes the unsteady flow, characterized in that a power system is coupled to the impeller to convert a rotational force of the impeller into an electric force. This configuration makes it possible to increase the velocity of the fluid flowing in, to convert an output into electric energy, and to increase an electric energy conversion rate.

A sixth aspect of the present invention is directed to a wind turbine having a non-streamline wind tunnel body capable of forming a stable vortex street on a downstream side from internal and external atmospheric flows and an impeller disposed inside the wind tunnel body, characterized in that the wind tunnel body has a vortex generator for forming the vortex street on the downstream side, the vortex generator is provided with a phase control structure which regulates, in a plane including a rear end face of the wind tunnel body, a phase of a vortex formation that fluctuates along a circumferential direction within the plane including the rear end face, and which clarifies a cell structure to be formed along the circumferential direction of the wind tunnel body to fix, on a surface of the wind tunnel body, positions of respective cells into a plurality of segmented regions arranged in the circumferential direction, and the phase control structure increases a velocity of the internal flow. This configuration makes it possible to stabilize a flow involving a vortex street, to increase a wind velocity of a wind flowing in, to enable an increase in size, and to generate power with high output.

A seventh aspect of the present invention is dependent from the sixth aspect, and is directed to the wind turbine characterized in that the phase control structure regulates, in the plane including the rear end face of the wind tunnel body, the phase of a vortex formation that fluctuates along the circumferential direction within the plane including the rear end face, clarifies the cell structure to be formed along the circumferential direction of the wind tunnel body to fix, on the surface of the wind tunnel body, the positions of the respective cells into the plurality of segmented regions arranged in the circumferential direction, shifts on a segmented region basis a vortex generation dominant region among the segmented regions to which the cells are fixed, and increases the velocity of the internal flow. This configuration makes it possible to stabilize the flow involving a vortex street, to increase the wind velocity of the wind flowing in, to enable an increase in size with a short flow passage, and to generate power with high output.

An eighth aspect of the present invention is dependent from the sixth or seventh aspect, and is directed to the wind turbine characterized in that the phase control structure includes phase control plates arranged such that the number of the phase control plates is the same as or an integer submultiple of the number of the cells of the cell structure spontaneously formed on the wind tunnel body by the flow. This configuration makes it possible to make the flow involving the vortex street most stable or substantially most stable streams, to increase the velocity of the fluid flowing in, to enable an increase in size, and to generate power with high output. Needless to say, the integer submultiple is a discrete integer.

A ninth aspect of the present invention is dependent from the sixth or seventh aspect, and is directed to the wind turbine characterized in that the vortex generator for forming the vortex street has a ring-shaped flange disposed on a downstream end of the wind tunnel body. This configuration makes it possible to make the flow involving the vortex street stable merely by providing the ring-shaped flange.

A tenth aspect of the present invention is dependent from the sixth or seventh aspect, and is directed to the wind turbine characterized in that a power system is coupled to the impeller to convert a rotational force of the impeller into an electric force. This configuration makes it possible to easily make the flow involving the vortex street most stable without conducting a test or the like, to increase the velocity of the fluid flowing in, to enable an increase in size, and to generate power with high output.

An eleventh aspect of the present invention is directed to a method for increasing a velocity of an internal flow of a fluid machine, including forming a stable vortex street from internal and external flows on a downstream side when the internal and external flows run inside and outside a non-streamline casing, and increasing the velocity of the internal flow running through the casing by reducing pressure on the downstream side due to the forming of the vortex street, characterized by including regulating, in a plane including a rear end face of the non-streamline casing, a phase of a vortex formation that fluctuates along a circumferential direction within the plane including the rear end face, and clarifying a cell structure to be formed in the circumferential direction of the casing to fix, on a surface of the casing, positions of respective cells into a plurality of segmented regions arranged within the plane including the rear end face and to stabilize the flow, wherein the velocity of the internal flow is increased due to the stabilization. This configuration makes it possible to stabilize the flow involving the vortex street and to increase the flow velocity of the internal flow by the flow on the outer side of the fluid machine.

A twelfth aspect of the present invention is dependent from the eleventh aspect, and is directed to the method for increasing the velocity of the internal flow of the fluid machine, characterized by including stabilizing a shift of a vortex generation dominant region that corresponds to the cell in which the vortex is formed by performing the shift on a segmented region basis, wherein the velocity of the internal flows is increased due to the stabilizing. This configuration makes it possible to stabilize the flow involving the vortex street and to increase the flow velocity of the internal flow by the flow on the outer side of the fluid machine.

A thirteenth aspect of the present invention is dependent form the eleventh or twelfth aspect, and is directed to the method for increasing the velocity of the internal flow of the fluid machine, characterized in that the segmented regions are made uniform to allow every segmented region to be the vortex generation dominant region. This configuration makes it possible to make the flow involving the vortex street most stable and to increase the flow velocity of the internal flow by the flow on the outer side of the fluid machine. Energy conversion rate can be enhanced.

First Embodiment

Hereinafter a fluid machine according to a first embodiment of the present invention utilizing an unsteady flow, particularly, a wind turbine and, more particularly, a wind power generator capable of generating electricity, and a method for increasing a velocity of an internal flow of the fluid machine will be described. What will be described are fluid machine having casing that covers a circumference of an impeller and that is equipped with a vortex generator, a wind turbine having a wind tunnel body equipped with a vortex generator of a ring-shaped flange in a flow of an atmosphere, and a wind power generator that is an example of the wind turbine.

Figure 2:
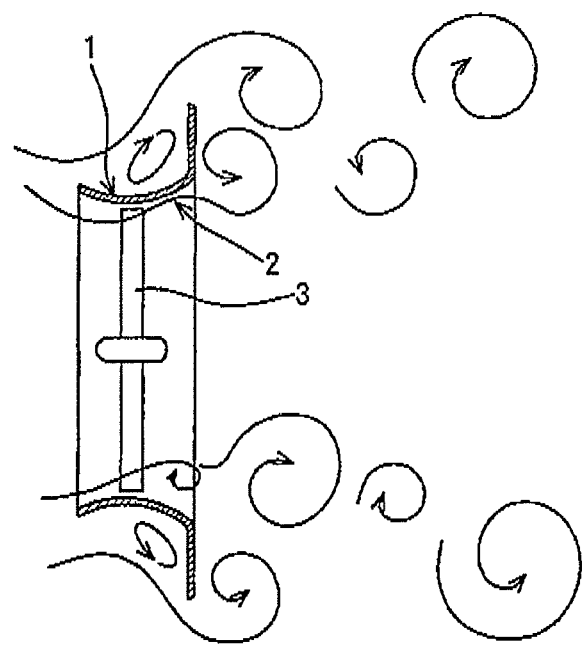
Figure 3:
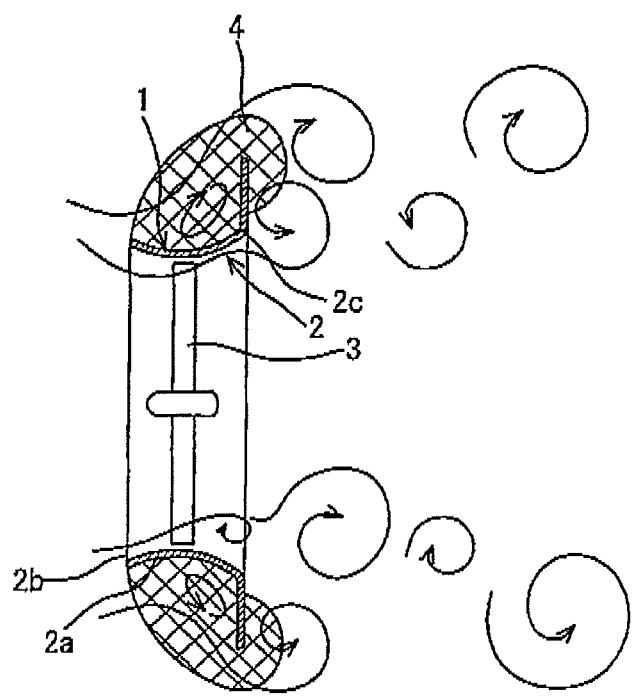
FIG. 3 is a vertical sectional view of the wind power generator of FIG. 1.
Figure 4:
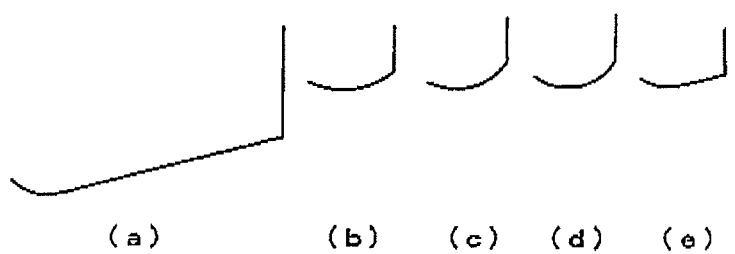
FIG. 4 is an explanatory diagram illustrating sectional shapes of wind tunnel bodies of various configurations.
Figure 5:
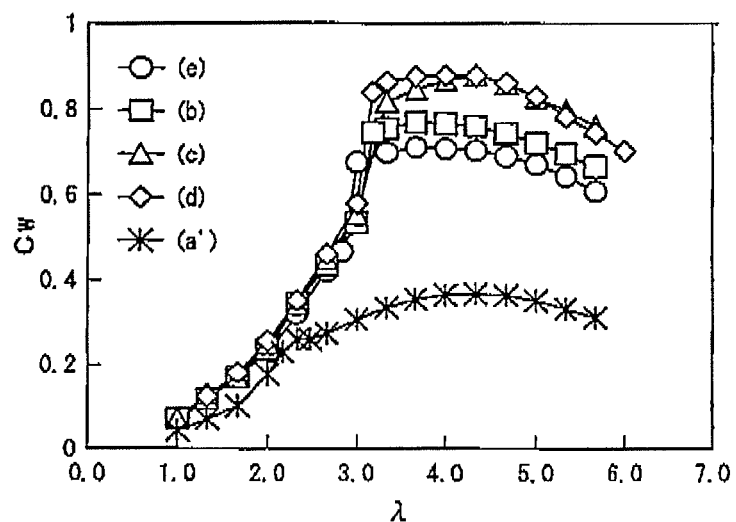
FIG. 5 is an explanatory diagram of output performance curves showing a relationship between an output coefficient Cw and a peripheral velocity ratio λ for each configuration in a case in which only an impeller is provided and in cases in which the impeller is disposed in one of the wind tunnel bodies of (b) to (e) of FIG. 4.
Figure 6:
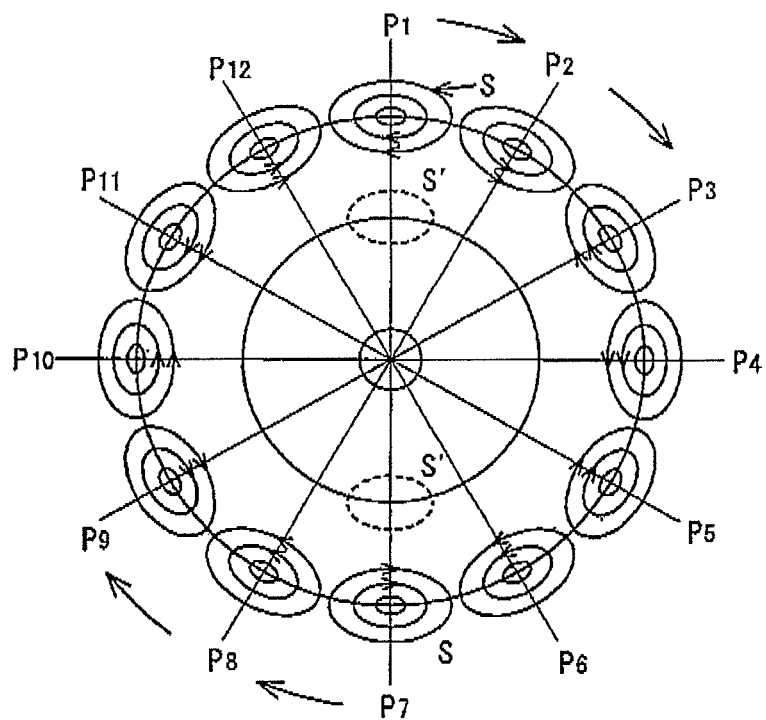
FIG. 6 is an explanatory diagram illustrating cell formations (circulations) in a flow field, depicted by subtracting a primary flow velocity component U of wind from three components (U, v, w) of a velocity vector of wind velocity on a downstream side of the wind power generator according to the first embodiment of the present invention.

FIG. 1 is a perspective view of a wind power generator according to the first embodiment of the present invention, having phase control plates and a flanged wind tunnel body. FIG. 2 illustrates internal and external flows around a fluid machine utilizing an unsteady flow and having the flanged wind tunnel body, and FIG. 3 is a vertical sectional view of the wind power generator of FIG. 1. FIG. 4 illustrates sectional shapes of wind tunnel bodies of various configurations, and FIG. 5 illustrates output performance curves showing a relationship between an output coefficient Cw and a peripheral velocity ratio λ for each configuration in a case in which only an impeller is provided and in cases in which the impeller is disposed in one of the wind tunnel bodies of (b) to (e) of FIG. 4. A performance curve designated by an asterisk in (a') is an output performance curve in the case in which only the impeller is provided. The output coefficient Cw and the peripheral velocity ratio will be described later. FIG. 6 is an explanatory diagram illustrating cell formations (circulations) in a flow field, depicted by subtracting a primary flow velocity component U of wind from three components (U, v, w) of a velocity vector of wind velocity on a downstream side of the wind power generator according to the first embodiment of the present invention.

Figure 7:
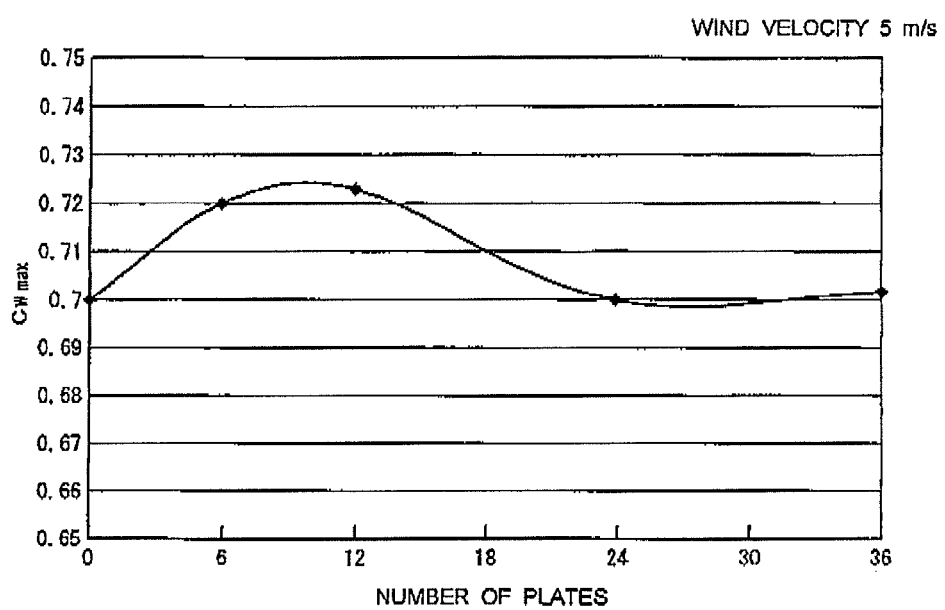
FIG. 7 is an explanatory diagram showing a relationship between the number of phase control plates and a maximum output coefficient $Cw_{max}$.
Figure 7:
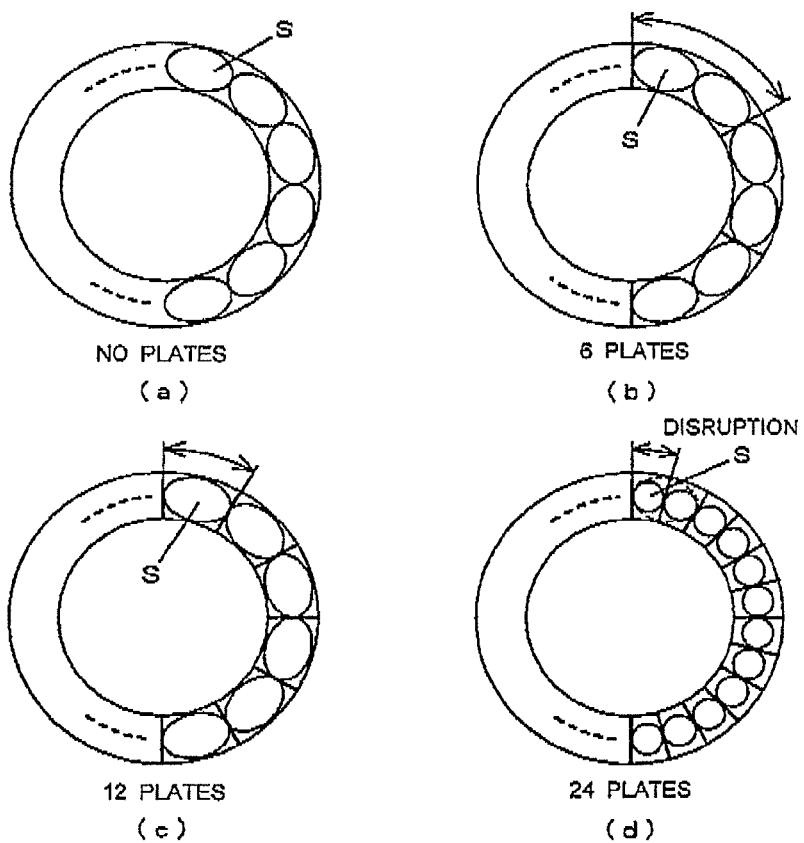
Figure 8:
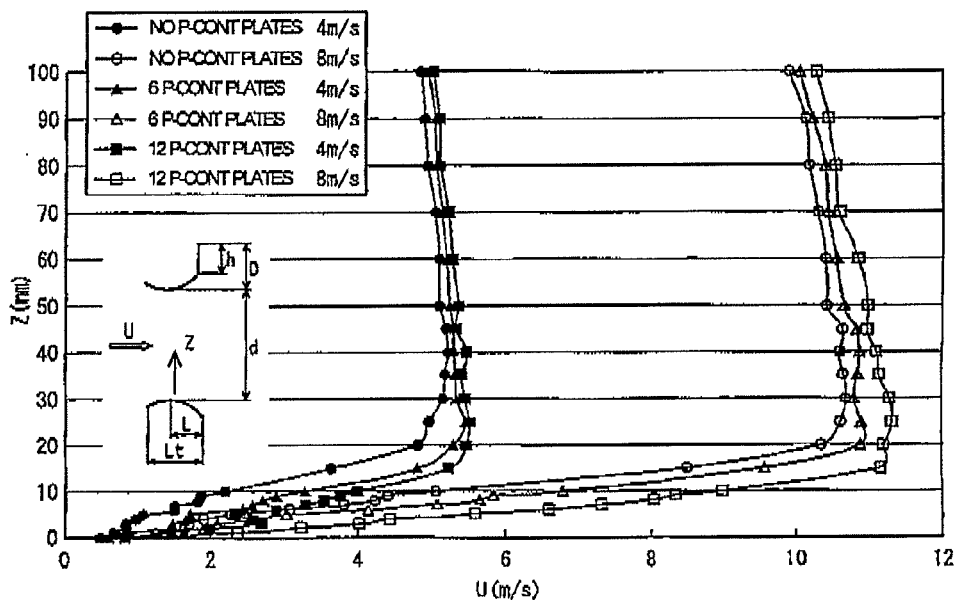
FIG. 8 is a graph quantitatively showing a phenomenon of an increase in wind velocity near an internal wall of the wind tunnel body when the phase control plates are attached as compared with a case where the phase control plates are not attached.
Figure 9:
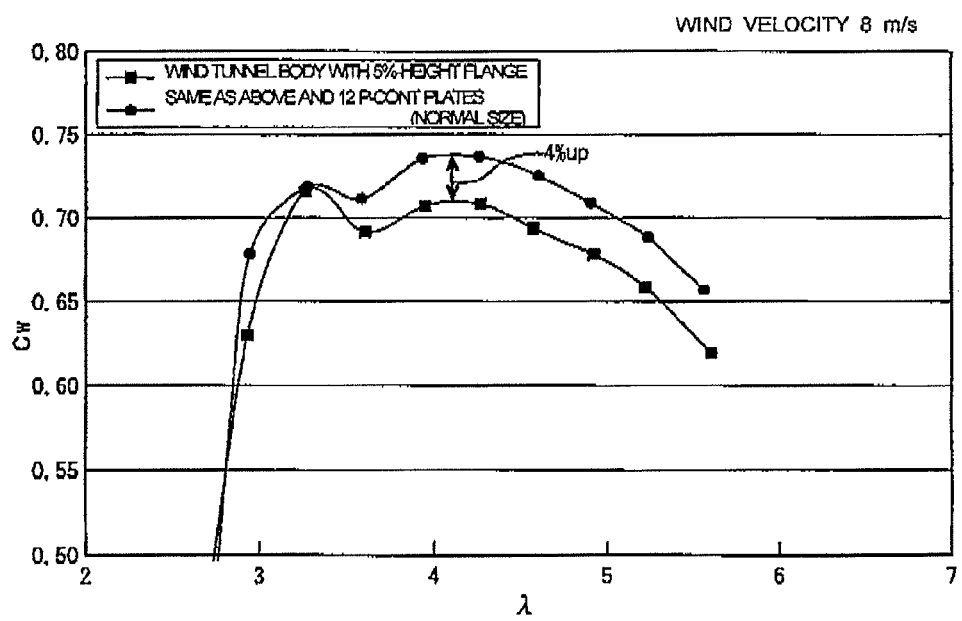
FIG. 9 is an explanatory diagram comparing output performances depending on whether the phase control plates are attached or not attached to a vortex generator of a 5%-height flange.
Figure 10:
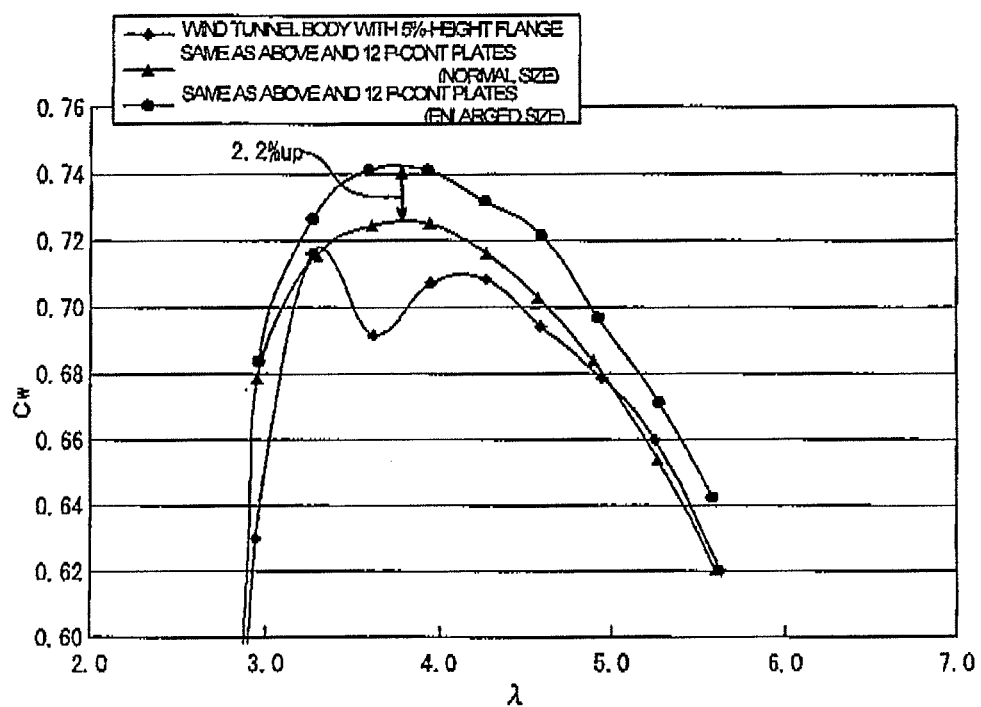
FIG. 10 is an explanatory diagram showing an influence of a size of the phase control plates in the first embodiment of the present invention.

FIG. 7 is an explanatory diagram showing a relationship between the number of phase control plates and a maximum output coefficient $Cw_{max}$. Diagrams (a), (b), (c) and (d) on the lower side illustrates patterns of phase control plates and cells. FIG. 8 is a graph quantitatively showing a phenomenon of an increase in wind velocity near an internal wall of the wind tunnel body when the phase control plates are attached as compared with a case where the phase control plates are not attached. FIG. 9 is an explanatory diagram comparing output performances depending on whether the phase control plates are attached or not attached to a vortex generator of a 5%-height flange, FIG. 10 is an explanatory diagram showing an influence of a size of the phase control plates in the first embodiment of the present invention, FIG. 11(a) is a picture of streak lines on a downstream side of the vortex generator to which the phase control plates of the first embodiment of the present invention are not attached, and FIG. 11(b) is a picture of streak lines on the downstream side of the vortex generator to which the phase control plates of the first embodiment of the present invention is attached.

Further, FIG. 12(a) is a picture of streak lines, taken from a side of the vortex generator to which the phase control plates of the first embodiment of the present invention are not attached, and FIG. 12(b) is a picture of streak lines, taken from a side of the vortex generator to which the phase control plates of the first embodiment of the present invention is attached. FIG. 13(a) is an instantaneous static pressure distribution on a wall surface on an inflow side (a front surface) of the vortex generator of 5%-height flange according to numerical calculation, and FIG. 13(b) is a static pressure distribution on a wall surface on the downstream side (a back surface) of this vortex generator at the same instant. Moreover, FIG. 14 is a schematic diagram of an internal block configuration of the wind power generator according to the first embodiment of the present invention in which a wind turbine generates electric power.

Figure 14:
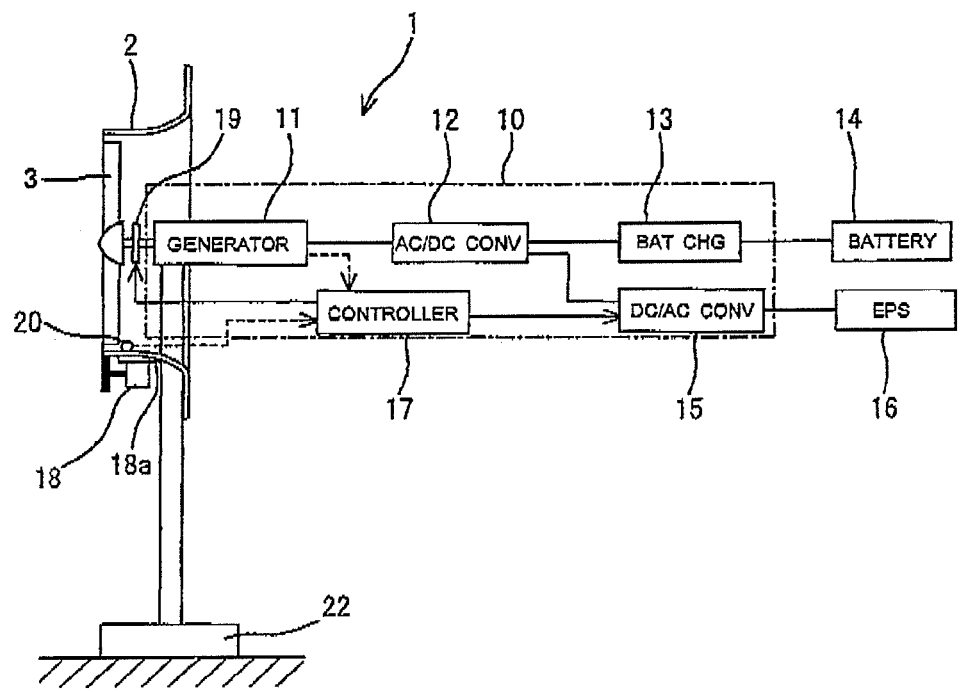
FIG. 14 is a schematic diagram of an internal block configuration of the wind power generator according to the first embodiment of the present invention in which a wind turbine generates electric power.

As shown in FIGS. 1, 2, and 14, the wind turbine according to the first embodiment of the present invention is a wind power generator 1, and an electric generator 11 (see FIG. 14) is coupled to the wind power generator. The electric generator 11 is driven by rotation of an impeller 3 of the wind turbine, thereby converting kinetic energy into electric energy. The wind power generator 1 has the impeller 3 that is rotated by wind and a wind tunnel body 2 of diffuser type that is cylindrical and that wholly has a non-streamline shape; in other words, a casing that encloses the impeller 3 and that separates an internal flow from an external flow. A plane of rotation of an extremity of the impeller 3 and the wind tunnel body 2 are disposed with a gap therebetween within a cross section orthogonal to a primary flow of the flow. There is formed a cylindrical shape extending in a longitudinal direction. The reason for the wind tunnel body 2 being embodied in the form of a diffuser type is that flow velocity achieved at the extremity of the impeller 3 is maximized by a throat portion 2a (a portion having the minimum cross sectional area) (see a cut-in of FIG. 8) and that the wind tunnel body becomes more compact than a wind tunnel body of a nozzle type. A wind inlet 2b serving as a wind collecting element is provided on an inlet side with respect to the throat 2a, and a cross section of a flow passage from an inflow end (edge) to the throat 2a is gradually reduced, thereby effecting acceleration.

In the conventional wind power generator 1, the throat 2a is disposed relatively close to the inflow end (edge) with a considerably small gap therebetween, as shown in FIG. 4(a). The impeller 3 is placed at the throat 2, and there is formed a shape in which a diffuser portion on a downstream side is emphasized. The diffuser has a shape that is quite long in its longitudinal direction. Among various types of wind tunnel bodies 2 shown in FIG. 4, a type of a wind tunnel body 2 shown in FIG. 4(a) corresponds to this type.

Even in the first embodiment, a cross section of a flow passage is enlarged on a downstream side of the throat 2a. A ring-shaped vortex generator 2c is provided around an end of the downstream side. The vortex generator 2c is included as a part of the wind tunnel body 2. Various types of wind tunnel bodies 2 are illustrated in FIGS. 4(a) to 4(e). Parameters specifying the wind tunnel body 2 become as illustrated in the cut-in of FIG. 8. A length of the wind tunnel body 2 is "Lt"; a length of a diffuser portion extending from the throat 2a to a rear end face is "L"; an inner diameter of the throat 2a is "d"; a height of the vortex generator 2c is "h"; and wind velocity achieved around the wind power generator 1 is "U."

The vortex generator 2c of a flange (a ring-shaped plate in the embodiment) is attached as a rear end portion of the wind tunnel body 2, whereby the wind tunnel body 2 is entirely given a non-streamline shape. Specifically, the wind power generator 1 is given a bluff body. This vortex generator 2c is an idea that is not included in the conventional turbo machine. Such a bluff body individually has a different shape and generates various flows. The present invention attempts to commonly deal with the flows by means of a member called the vortex generator 2c. Specifically, unlike the conventional art in which a flow around fluid machine are caused to smoothly flow to maintain linearity, an intensive vortex to be called a Karman vortex is generated on the downstream side by providing the vortex generator 2c. An attempt is made to stabilize a flow involving generation of vortices and generalize maintaining of stability.

The Karman vortex is unsteadily (alternately) generated on the downstream side of the wind tunnel body 2. Specifically, when a radial height of the vortex generator 2c is sufficiently smaller than an inner diameter of the throat 2a of the wind tunnel body 2 (h/d<<1), cells S and S' are generated at certain timing in; for instance, 12 segmented regions on a vortex generation fluctuation scale depicted by $P_1$ to $P_{12}$ shown in FIG. 6 (the segmented regions are given areas occupying a surface of the wind tunnel body 2 and hereinafter called "zones"). When the generation of a vortex at a position $P_1$ becomes intensified, an intensive Karmen vortex street is generated at cross-sectional positions of the cell S and the cell S' of the position $P_1$. The zone designates a location on the surface of the wind tunnel body 2, whilst the cell designates a flow structure formed in the flow. The flow is divided into a plurality of sections within a plane of the rear end, and a vortex street is generated on a downstream side of the wind tunnel body. A zone corresponding to the cells S and S' of (n=1, 2, 3 . . . , 12) where generation of a vortex becomes intensive is a vortex generation dominant zone (a vortex generation dominant region according to the first embodiment of the present invention which will hereinafter be referred to as the vortex generation dominant zone). Any zone $P_n$ becomes independently intensive or less intensive. The vortex generation dominant zone $P_n$ changes its place among the 12 cells, and a three-dimensional vortex street is generated on the downstream side. As a result of generation of the vortex street, stable low pressure exists in the vicinity of a outlet of the wind tunnel body 2, whereby flow velocity of the internal flow is increased by a pressure difference. By virtue of the speedup, the impeller 3 rotates at high speed, so that the wind turbine can output high torque drive force. The wind power generator 1 can generate high-power electricity. The wind turbine of the ordinary wind power generator 1 frequently satisfies a condition that the radial height of the vortex generator 2c is sufficiently smaller than the inner diameter of the throat 2a of the wind tunnel body 2 (h/d<<1), and generation of such a vortex takes place.

On the contrary, when the radial height of the vortex generator 2c remains unchanged with respect to an internal diameter of the throat 2a of the wind tunnel body 2 in terms of an order of magnitude (when the parameters "h" and "d" are of the same order of magnitude, h/d≈1), relevance among the zones $P_n$ (n=1, 2, 3, . . . , 12) making up one cross section of the wind tunnel body 2 becomes intensified (independence of the zones becomes lost). As a consequence, generation of a vortex simultaneously takes place in a pair of zones $P_n$ and $P_{n+6}$ (n=1, 2, 3, . . . , 12) that are diagonally aligned to each other and where cells are fixed. In short, generation of an intensive vortex takes place in both zones. Even when a vortex street is generated, stable low pressure exists in the vicinity of the outlet of the wind tunnel body 2, so that the flow velocity of the internal flow can be increased by a pressure difference.

As mentioned above, generation of a vortex occurred in each of the zones includes two levels of vortex generation; i.e., (1) generation of an extremely stable, intensive vortex exhibiting poor independence of each of the zones (in other words; relevance between vortex streets is intensive) and (2) generation of a vortex that exhibits independence (vortexes are separately generated) and low stability. At least when the vortex generation dominant zone $P_n$ achieved in the case of generation of a less stable vortex becomes less clear among the zones, action of the vortex street decreases, so that the vortex street and the internal flow cannot be said to be stable. Specifically, switching of the vortex generation dominant zone $P_n$ performed on a per-zone basis cannot smoothly take place. A method for controlling switching of the vortex generation dominant zone will be described later.

FIGS. 1 and 2 show the wind power generator 1 having the vortex generator 2c having a shape formed by connection of a curved surface of a rotator with the ring-shaped flange; namely, a cross-sectional profile bent in a direction aligned to a rotary shaft. However, the vortex generator 2c is not limited to a ring-shaped flat plate. The essential requirement for the shape of the vortex generator 2c is to impart a non-streamline shape to the wind tunnel body 2 and effectively generate a vortex at the position of the downstream end. As will be described later, the flange may have a shape whose circumference exhibits regularity and periodicity in a circumferential direction, such as a square shape and a hexagonal shape.

FIG. 3 shows the wind power generator 1 in which a portion of the wind tunnel body 2 not including the vortex generator 2c is formed as a rotator having a comparatively small curvature radius and a two-dimensional curve and corresponds to a two-dimensional curved casing having a cross-sectional profile shown in FIG. 4(d). FIG. 4 shows sectional shapes of the wind tunnel bodies 2 having various shapes. FIG. 5 shows a relationship between an output coefficient Cw of profiles as indicated by reference symbols (b) to (e) and a peripheral velocity ratio λ and a relationship between the output coefficient Cw achieved when the wind tunnel body is a mere impeller as indicated by reference symbol (a') and the peripheral velocity ratio λ. It is understood that the two-dimensionally-curved wind tunnel body 2, such as that shown in FIGS. 4(b) to 4(e), is more effective when compared with a case where the impeller 3 is exposed in the atmosphere. The peripheral velocity ratio λ is a ratio (=rΩ/U) of a circumferential speed rΩ (m/s) to wind velocity U (m/s) of the impeller, where reference symbol "r" denotes a radius of the impeller and Ω denotes an angular frequency (1/s). The output coefficient Cw is a dimensionless quantity and expressed as $Cw=W/\{(1/2)\pi\rho U^3 r^2\}$, where reference symbol W denotes an output of power generation, ρ denotes an air density (kg/m³), and "r" is a radius (m) of an impeller.

Turning back to FIGS. 1 and 3, phase control plates 4 (corresponding to phase control structure according to the first embodiment of the present invention) are provided on the surface of the vortex generator 2c in the first embodiment. The phase control plates 4 regulate, on a plane including a rear end face of the wind tunnel body 2, a phase of the flow that fluctuates along the circumferential direction within the plane including the rear end face due to the vortex formation, and clarify a cell structure to be formed around the wind tunnel body 2, to fix the positions of the respective cells into the plurality of zones arranged on the surface of the wind tunnel body 2 along the circumferential direction. The vortex generation dominant zone is switched for each of ranges (zones) of the vortex generation fluctuation scales where generation of a vortex becomes intensified or less intensified. Specifically, switching of the vortex generation dominant zone is performed for each zone whose position is fixed by means of clarification, to thus be stabilized. In relation to generation of two types of vortexes (1) and (2), the phase control plates 4 are arranged in accordance with an environment and a cell structure of each of the two types of vortexes. Thus, each of the cells is clarified, whereby the position of the cell is fixed.

Accordingly, when stabilization is achieved on a per-zone basis by the phase control plates 4, attention must be paid to the following two cases. In a first case, the zone is switched on a per-zone basis; in other words, each of the zones is independently stabilized by means of the phase control plate 4. In a second case, switching is performed for each pair of zones; namely, the phase control plates 4 simultaneously stabilize a pair of zones (two zones are used as a single unit). Which one of the cases is selected is basically dependent on the shape of the wind tunnel body 2.

When the wind tunnel body 2 has a shape that is symmetric with respect to an axis, the phase control plates 4 are arranged at a predetermined pitch in the circumferential direction of the vortex generator 2c. Specific explanations are hereunder provided with respect to how the phase control plates 4 are arranged on the wind tunnel body 2.

The internal and external flows of the wind tunnel body 2 are separated from each other over entire external and internal circumferences of the wind tunnel body 2, and a Kaman vortex is generated by each of downstream, circumferential cross sections. As mentioned previously, in relation to generation of a vortex along each of the cross sections, unevenness (fluctuations); i.e., generation of an intensive vortex and generation of a less intensive vortex, are present in the circumferential direction. A circumferential range in which generation of an intensive vortex and generation of a less intensive vortex appear is somewhat smaller in scale (3 $d_c$ to 4 $d_c$, $d_c$: a cylinder diameter) than a vortex generation fluctuation scale achieved in the axial direction of a two-dimensional cylinder. When a projected width of each of toroidal cross sections viewed from the primary flow of the wind tunnel body 2 is D (including a height "h" of the flange) (see FIG. 8), the vortex generation fluctuation scale achieved in the circumferential direction of the wind tunnel body comes to 2 D to 3 D. This also corresponds to the fact that the two-dimensional cylinder is closed in a toxic fashion, to thus have a three-dimensional shape, which is also quantitatively corroborated. This will be described later. Twelve that is the most effective number of phase control plates 4 (see FIG. 7) corresponds to a circular-arc range having a projected width of about 2 D in a circumferential direction with reference to a projected width D of each of the cross sections of the wind tunnel body 2. When the number of phase control plates is six that is slightly inferior to 12, a corresponding circular-arc range has a projected width of about 4 D.

When the number of phase control plates is "N" and an inner diameter of the wind tunnel body 2 is "d," a vortex generation fluctuation scale corresponding to a two-dimensional aspect ratio is $\{\pi(d+D)D/DN\}=\pi(d+D)/N$. A projected width 2 D to 3 D is for a case where N is twelve, wherein d/h is equivalent to a value of about six to twelve. Accordingly, the vortex generation fluctuation scale caused by the phase control plates 4 is understood to extend over a case where the respective zones are separately stabilized (h/d<<1) and a case where a pair of zones are simultaneously stabilized ("h" and "d" are of the same order of magnitude).

FIG. 6 shows an external flow around the vortex generator 2c at the downstream side of the wind power generator 1. Although unillustrated, similar circulating cells are formed in a flow from which an internal flow that has passed through an interior of the wind tunnel body 2 including the vortex generator 2c separates as well as in a flow formed in a cavity region located in front of the vortex generator 2c. The cell structure shown in FIG. 6 corresponds to a circulatory flow developing around the non-streamline object in its circumferential direction. The cell structure is expressed when a primary component U of wind velocity is subtracted from three components (U+u, v, w) of a velocity vector of the current flow achieved in a flow field. The circulatory cells S and S' formed in each of the circumferential zones $P_1$ to $P_{12}$ serve as units of the cell structure.

Figure 13:
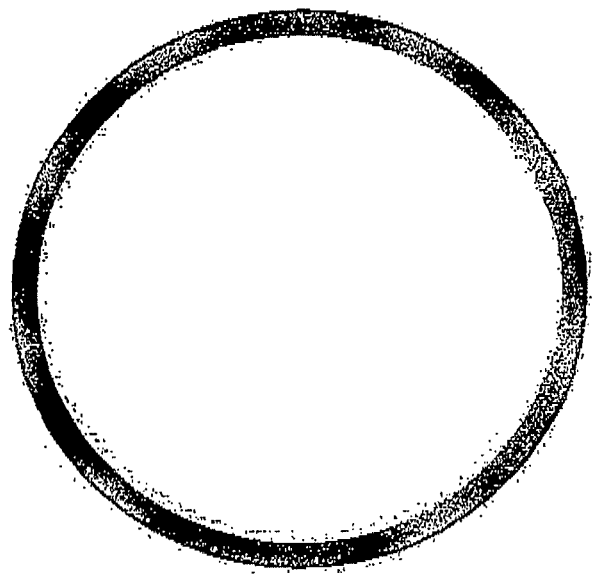
FIG. 13(a) is an instantaneous static pressure distribution on a wall surface on an inflow side of the vortex generator of 5%-height flange according to numerical calculation.
FIG. 13(b) is a static pressure distribution on a wall surface on the downstream side of this vortex generator at the same instant according to numerical calculation.
Figure 13:
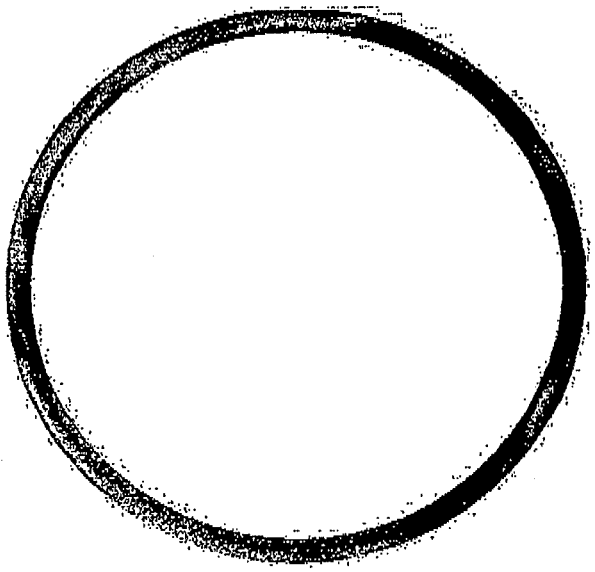

FIG. 13 shows generation of such cells simulated through numerical computation. The simulation corresponds to simulation equivalent to a case where any of the plurality of zones independently becomes intensive or less intensive and a case of generation of less stable vortexes. FIG. 13(a) shows an instantaneous static pressure distribution on a wall surface on an inflow side (a front surface) of the vortex generator of 5%-height flange, and FIG. 13(b) shows a static pressure distribution on a wall surface on the downstream side (a back surface) of this vortex generator at the same instant. In FIG. 13(a), the most intense gray color depicts an area having low static pressure, and a less intense gray color depicts an area having high static pressure. From a computation result, it is seen that areas showing high and low pressures are randomly distributed at certain timing in a circumferential direction. The distributed state changes to another distributed state at the next moment by means of fluctuations. As illustrated in FIGS. 13(a) and 13(b), similar high and low pressure areas alternately appear in both distributions of static pressure arising in the inflow side and the downstream side. Since constant-pressure lines are closed, the cells and the cell structures are ascertained to be formed in the flow. By virtue of the front and rear cell structures formed on the downstream side and the inflow side of the rear end face, the primary flow can flow in a curved manner along the circumference of the wind tunnel body 2. Since numerical computation does not involve installation of installation of phase control structure, each of the cells has a long or short width. It is also understood from simulation based on numerical computation that the cell structure is formed in a circumferential direction within a plane of the rear end of the wind tunnel body 2.

Intensity fluctuations in generation of a vortex move on a per-cell basis in the circumferential direction of the wind tunnel body 2. In the case of the wind tunnel body 2 and the vortex generator 2c that are symmetrical with respect to an axis, it is theoretically considered that a deviation should not exist in the circumferential direction. There is a high probability of the fluctuations moving with uniform periodicity and regularity. However, in a real object, it is difficult to manufacture a wind tunnel body in an ideal shape with a perfect axial symmetry. In addition, an actual flow slightly differs from an ideal, uniform flow. Therefore, the twelve zones $P_1$ to $P_{12}$ arranged in an annular pattern independently become intensified or less intensified, or a pair of cells in the zones independently become intensified or less intensified. One $P_n$ or a pair of $P_n$ and $P_{n+6}$ existing in one cross sectional plane become intensified in a certain time period (timing). Accordingly, when a fact of real machinery is taken into account, the fluctuations may rotate in one direction or randomly move.

In the case of the vortex generator 2c formed from; for instance, a three-dimensional tetragonal plate or a rectangular plate, switching takes place between two orthogonal vortex generation dominant zones built from a total of two sets, each of which is made up of two upright sides. However, when a test is actually conducted, periodicity of switching is random. Requirements for realizing a state of such a flow illustrated in FIG. 6 are to fulfill a relationship of h/d<<1 between the inner diameter "d" of the throat 2a and a radial height "h" of the vortex generator 2c or a relationship of "h" and "d" being of the same order of magnitude.

In short, provided that the cell structure is formed in the segmented regions of the wind tunnel body 2 partitioned by the phase control plates 4 denoted by reference symbols $P_1$ to $P_{12}$ shown in FIG. 6; namely, the zones, in the certain time period $t_1$ and that the zone $P_1$ becomes a vortex generation dominant zone as a result of intensification of generation of a vortex at the position of the zone $P_1$, generation of an intensive Karman vortex takes place in the zones located at positions of the cross sections of the cells S and S' in a time period $t_1$. When a next certain time period $t_2$ comes, a Karman vortex is intensively generated in the zones located at positions of the cross sections of the cells S and S' of another zone $P_n$. Switching of such a vortex generation dominant zone takes place separately in the 12 cell structures (zones); namely, the respective zones $P_n$. Alternatively, a pair consisting of $P_n$ and $P_{n+6}$ are switched together, thereby generating a three-dimensional vortex street on the downstream side. In relation to a sequence of the vortex generation dominant zone switching between the cells of the zones partitioned by the phase control plates 4 located in $P_1$ to $P_{12}$, the zones may have already moved or rotated separately or in a paired manner in a certain direction (movement or rotation is iterated in a proper sequence of n=1, 2, 3, . . . , 12) or may have moved randomly (n=i, k, j, . . . ).

However, in the first embodiment, the circumference of the vortex generator 2c, including both external and internal circumferences, are partitioned into the segmented regions $P_1$ to $P_{12}$ shown in FIG. 6 by use of the phase control plates 4, thereby making the cells of the cell structures independent of each other. As a result, the respective cells located in the circumferential direction do not move and exert an influence in excess of the phase control plates 4. Positions of the respective cells are fixed, and circulation of each of the cells (a cell located in a flow field defined by subtracting the velocity component U of the primary flow of the wind from the three components (U+u, v, w) of the velocity vector) is clarified. The position of generation of a Karman vortex can be moved on each thus-clarified cell, so that the entire flow can be forcefully stabilized. When the phase control plates 4 are not provided, the positions of the cells move, and the cells expand or contract in terms of a size. When compared with a case where the phase control plates 4 are provided, switching of the zones is changed in terms of timing and sequence. Further, a Karman vortex generated on the downstream side also becomes devoid of stability under influence of variations in the cells. When the Vortex generation dominant zones become unclear, action of the vortex street is deteriorated, whereupon the vortex street and the internal flow cannot be said to be stable. The phase control plates 4 bring the cells in correspondence with the zones, thereby stabilizing and fixing the positions of the cells. This is an advantage by providing the phase control plates 4. On the contrary, conventional straightening vanes are intended solely for rectifying and making a flow smooth without regard to the cell structures and the Kaman vortex.

There is provided a further complement to fluctuations in the flow on the surface of the non-streamline object. Fluctuations, such as generation of an intensive vortex and generation of a less intensive vortex, also arise in a two-dimensional cylinder. However, the wind tunnel body 2 has a three-dimensional shape as a result of a so-called two-dimensional cylinder being closed in an annular form. Therefore, in a three-dimensional flow field, the vortex generation fluctuation scale slightly becomes smaller due to the three-dimensional shape. Specifically, in the case of fluctuations of a three-dimensional object as distinct from fluctuations of a two-dimensional object having an infinite length, centrifugal force exerts an influence, thereby increasing instability of the fluctuations and making the vortex generation fluctuation scale smaller.

Accordingly, a variation arises in the fluctuation scale in conjunction with a change in shape of fluctuations. However, the flow on the surface of the non-streamline object does not simultaneously separate along a single line in a circumferential direction even when the object is symmetrical with respect to an axis in the direction of the primary flow U. Unevenness arises in intensity in a circumferential direction on a per-cell basis, to thus generate fluctuations. As in the case of the first embodiment, when the phase control plates 4 that do not divide the cells are provided, the positions of the respective cells do not become unstable in the circumferential direction, and strength of the cells is also fixed, whereby the cells are mutually clarified. The position for generating a Karman vortex is moved one by one for the thus-clarified, stabilized cells. As a result, the entire flow field becomes stabilized. Further, when all of the zones are uniformly made in connection with generation of a vortex, the chance of each of the zones equally becoming a vortex generation dominant zone is enhanced, so that a flow involving a vortex street can be stabilized.

Incidentally, if the number of phase control plates 4 and the number of zones are made larger than the number of cells formed by natural flow, the original cells will forcefully be divided, and vortexes developing on the downstream side will not become so intensive. The vortex formation dominant zone will also become less noticeable. Even when the number of phase control plates 4 and the number of zones are made smaller than the number of cells, a plurality of cells will exist in one zone. The respective cells expand, contract, move, and affect each other, thereby weakening stabilizing action. Even in this case, the vortexes will not become intensive when compared with a case where the phase control plates and the zones are equal in number to the cells. FIGS. 7(a), (b), (c), and (d) schematically illustrate the foregoing phenomena. Accordingly, the highest efficiency is accomplished when the number of phase control plates 4 is made equal to the number of cells naturally formed in accordance with the shape of the non-streamline wind tunnel body. In connection with the wind power generator 1, since the phase control plates 4 are plates, the structural strength of the wind power generator 1 can indirectly be increased by selecting a material of the phase control plates. If the structure of the wind tunnel body 2 is reinforced by provision of the phase control plates 4, enhanced reinforcement will become an aid to implement a large wind turbine which will receive a great hope in future, so that realization of the wind turbine can be promoted.

Flows around the wind power generator 1 are basically random, such as natural wind. The phase control plates 4 forcibly facilitate generation of stable cells from the random flows. Specifically, the phase control plates 4 clarify cell structures that potentially exist in the original bluff body, stabilizes the flows, and increases wind velocity.

When the flow around the wind tunnel body 2 are actually observed, it is understood that phases of generation of vortexes are regulated in the respective zones partitioned by the phase control plates 4, as in the case of a two-dimensional object (see a picture shown in FIG. 11(b)). As a result of the regulation of the phases, considerably intensive vortexes are generated behind the wind tunnel body 2 (a strong drag exists behind as can be seen from FIG. 12(b)), so that static pressure developing in the vicinity of the behind of the wind tunnel body becomes lower. Specifically, variations or offsets in intensity of generation of a vortex in the circumferential direction of the wind tunnel body 2; namely, presence of a zone where an intensive vortex is generated and another zone where a less intensive vortex is generated, disappear in a certain time period, so that generation of vortexes in the respective zones can be stabilized at all times. When compared with the case where the phase control plates 4 are not provided, generation of more intensive vortexes is performed in a longer period of time, whereupon much lower pressure develops behind the wind tunnel body 2. The configuration makes it possible to make the flow involving the vortex streets stable. As a result, the velocity of an inflow of fluid is increased, and a shorter, larger diffuser becomes feasible. Thus, an energy conversion rate can be increased.

A phase control structure not having the phase control plates 4, such as that shown in FIG. 2, is also conceivable. Specifically, in the case of a non-streamline shape that is symmetrical with respect to an axis, an h/d unique to the bluff body is selected. Further, segmented regions are formed by means of imparting to inducing members capable of partitioning zones a configuration; for instance, a shape exhibiting regularity and periodicity in the circumferential direction of the vortex generator $2c$, a polygonal shape having periodic projections in the circumferential direction, a shape exhibiting a change according to a trigonometric function in the circumferential direction, a periodic distribution of projections, and the like. The positions and sizes of the cells S and S' and switching of the vortex generation dominant zones are stabilized and regularized. Working effects similar to those yielded when the phase control plates 4 are provided can also be yielded. A shape that is imparted to the vortex generator $2c$ and that exhibits regularity makes up a phase control structure. Respective areas partitioned by the inducing member act as zones for generating vortexes. Thus, the vortex generation dominant zone is generated, and the cell structures can be clarified as in the case of the phase control plates 4.

The foregoing descriptions are not limited to the wind power generator 1 and also apply to fluid machine that runs in internal and external flows and that utilizes vortex streets. The optimum number of cells S and S' and the optimum positions of the phase control plates 4 are selected, whereby flows are stabilized, and wind velocity is increased. Thus, an increase in the size of the wind power generator becomes feasible, and high-power electricity generation can be carried out.

Incidentally, FIG. 8 shows results of measurement of a distribution of wind velocity achieved in the wind tunnel body 2. Measurement is performed in the wind tunnel body 2. In the wind tunnel body, a flange (the vortex generator $2c$) having a height "h" that is 10% of the diameter "d" of the throat $2a$ is attached to a rear end of a rotor casing of a two-dimensionally curve whose cross-sectional profile has a comparatively small curvature radius shown in FIG. 4(d). Wind having velocity U of 4 (m/sec) and wind having velocity U of 8 (m/sec) were sent in the wind tunnel body 2 as external flows, and a distribution of wind velocity was measured. As shown in FIG. 8, Z (mm) of the wind velocity distribution designates a height of the throat $2a$ from an inner circumferential surface to the shaft center.

In FIG. 8, when the phase control plates 4 are provided, wind velocitys of both the external flows of 4 (m/sec) and 8 (m/sec) are increased several percents in the throat $2a$. Noticeable speedup arises particularly in close proximity to the inner circumferential surface. A conceivable reason for this is drawing-in action effected by stabilized, intensified vortexes. It is understood that, as the velocity U of the external flows increases, average velocity also increases, and flow velocity achieved in the vicinity of the extremity of the impeller 3 becomes greater than that achieved in the center of the impeller.

There are now described results of tests conducted as to whether or not an increase or decrease arises in average velocity and flow velocity achieved at the extremity of the impeller 3 and in the output coefficient Cw when the influence exerted by the number N of the phase control plates 4; namely the number N of the phase control plates 4, increases or decreases. FIG. 7 shows a relationship between the number N of the phase control plates 4 and the maximum output coefficient $Cw_{max}$. As mentioned above, the output coefficient Cw is a dimensionless quantity; namely, $Cw=W/\{(\frac{1}{2})\pi\rho U^3 r^2\}$. The maximum output coefficient $Cw_{max}$ is the maximum value of Cw (see a value appearing in the vicinity of $\lambda=4$ in FIG. 5). The tests were conducted by use of the wind tunnel body 2 shown in FIG. 4(d) in which a flange having a height "h" that is 10% of the diameter of the throat is attached to a rotor casing whose cross-sectional profile has a comparatively small curvature radius. In any tests, the wind velocity was 5 (m/sec).

From the test results, when the number N of the phase control plates 4 is 12, the maximum value $Cw_{max}=0.723$ is obtained. When the number N of the phase control plates 4 is six, the maximum value $Cw_{max}=0.72$ is obtained. When the phase control plates 4 are not provided and when the number N of the phase control plates 4 is 24, the maximum value $Cw_{max}=0.7$ is obtained. When the number N of the phase control plates 4 is 36, the maximum value $Cw_{max}=0.701$ is obtained. These results are obtained when a relationship of h/d<<1 is fulfilled at h/d=0.17 and show that, when the number N of the phase control plates is 12 where cells are formed by natural flows, the highest efficiency and a high output are obtained. FIG. 7(c) schematically shows the state. The internal flow is speeded up at this time, to thus become stable.

When the number N of the phase control plates is set to six ($\frac{1}{2}$), two cells are controlled in one zone. Since a plurality of cells are present in one zone, the cells exert influence on each other, and the cells become unstable correspondingly. When compared with the case where the number N of the phase control plates is 12, the vortex generation dominant zone becomes less clear in terms of intensity. FIG. 7(b) schematically shows the state. When compared with the case where the phase control plates 4 are not provided, a relatively high output is produced. When the number of cells included in one zone becomes larger than two and when "m" (m=3, 4, ...) cells are included in one zone, namely, when the number of the phase control plates 4 is 1/m (which is of course an integer), the output further decreases. The vortex generation dominant zone gradually becomes less clear. As a result of generation of cells being left to the natural flows, the number "m" of cells becomes maximum, and the output continues decreasing until the number of zones comes to one in the entire wind tunnel body 2 (in other words, until there arises a case where the phase control plates 4 are not provided as shown in FIG. 7(a)).

Conversely, when the number N of the phase control plates becomes greater than the number of cells, cells that are originally to be naturally generated are forcefully divided into a plurality of cells as indicated by broken lines in FIG. 7(d). Although the flows become smooth, presence and functions of the vortex generation dominant zone for controlling the vortex streets are lost, and the output does not increase. This is a reason why the maximum output coefficient $Cw_{max}$ that is nearly close to N=0 is provided when N is 24 and 36. In short, the essential requirement is to prevent the cells from becoming unstable and to stably switch the vortex generation dominant zone by means of the phase control plates 4. Providing the phase control plates 4 makes it possible to clarify and fix the cell structures. However, movement of the clarified vortex generation dominant zone can stably be performed on a per-zone basis by limiting the number N of the phase control plates 4 to a predetermined number or changing the shapes of the phase control plates. Conversely, it is desirable that the bluff body be provided with the phase control plates 4 such that movement of the vortex generation dominant zone is stably performed on a per-zone basis.

The foregoing test results are yielded by the wind tunnel body 2 exhibiting a relationship of h/d<1. However, the same basically applies to a case where the flange is a polygonal ring, such as a square ring, a hexagonal ring, and an octagonal ring, so long as an axial symmetry is obtained. In this case, the phase control structure is not provided with the phase control plates 4. Even in this case, the cells are clarified by selecting the h/d and imparting regularity and periodicity to the vortex generator 2c, which forms the respective zones, in its circumferential direction. Movement of the thus-clarified vortex generation dominant zone can stably be performed on a per-zone basis.

FIG. 9 shows a comparison between with and without the phase control plates 4 in terms of the relationship between the peripheral velocity ratio λ and the output coefficient Cw. The vortex generator 2c was a flange (ring) having a height that is 5% of the diameter of the throat 2a, and the comparison was made between the phase control plates 4 of ordinary size which will be described later attached and not attached. Wind velocity was 8 (m/sec). The comparison shows a significant decrease in output coefficient Cw at the peripheral velocity ratio λ=3.6 or thereabouts when the phase control plates 4 are not provided. On the contrary, in the wind power generator 1 with the phase control plates 4, occurrence of a slight decrease at the peripheral velocity ratio λ=3.6 or thereabouts is observed. However, from the entire viewpoint, an increase of about 4% in output coefficient Cw is observed. An effect yielded by the phase control plates is noticeable at λ>4.

Subsequently, the influence of size of the phase control plate 4 is examined. FIG. 10 shows a comparison between a case in which two kinds of differently-sized phase control plates 4 are attached to the 5%-height flange (a ring) and in a case in which only the 5%-height flange (the ring) is provided. Wind velocity is 8 (mine). Twelve phase control plates 4 are provided at uniform pitch.

The phase control plate 4 of one type (hereinafter called a "normal size") has a length of 1.46 times a length Lt of the wind tunnel body 2. An extension whose length is 0.36 times the length Lt is provided on a downstream side of the phase control plate. The phase control plate has a fig-shaped cross-sectional profile whose height is about 2.0 times the height "h" of the ring (see FIGS. 1 and 3). A notch that enables insertion of the phase control plate to the vortex generator 2c on the downstream side of the wind tunnel body 2 is made in the phase control plate. The tested phase control plate of the other type is of enlarged size. The length of the phase control plate is 1.8 times the height "Lt" of the wind tunnel body 2. Further, an extension whose length is 0.55 times the length of the wind tunnel body is provided on a downstream side of the phase control plate. The phase control plate has a fig-shaped cross-sectional profile whose height is about 3.0 times the height "h" of the ring. A similar notch that enables insertion of the phase control plate to the vortex generator 2c is made in the phase control plate. Schematic shapes of the phase control plates 4 are illustrated in FIGS. 1 and 3.

FIG. 10 provides results of a test pertaining to a comparison between the wind power generator 1 having the wind tunnel body 2 equipped with the flange (ring) whose height "h" is 5% of the diameter "d" of the throat 2a and that has 12 phase control plates 4 of normal size, the wind power generator 1 including the wind tunnel body 2 equipped with the flange (ring) whose height "h" is 5% of the diameter "d" of the throat 2a and that has 12 phase control plates 4 of enlarged size, and the wind power generator 1 not having the phase control panels 4.

The results show that, in the case of the wind power generator not having the phase control plates 4, a significant decrease arises in output coefficient Cw at the peripheral velocity ratio λ=3.6 or thereabouts in the same manner as shown in FIG. 9, but no fall arises in the wind power generator 1 equipped with the phase control plates 4 of normal size. When compared with the case of the test shown in FIG. 9, a significant difference is not found at the peripheral velocity ratio λ>5 or more in connection with the output coefficient Cw. However, a difference of about 0.03 arises in output coefficient Cw at around the peripheral velocity ratio λ=4 where the maximum output coefficient $Cw_{max}$ is obtained. This is of considerable practical importance. In the wind power generator 1 having the phase control plates 4 of enlarged size, no fall appears in the vicinity of the peripheral velocity ratio λ=3.6. When compared with the output coefficient Cw of the wind power generator 1 having the phase control plates 4 of normal size, the output coefficient Cw is improved by about 0.02. This means that an output from the wind power generator equipped with the phase control plates of enlarged size is improved by 2.2% as compared with the output from the wind power generator equipped with the phase control plates of normal size.

Figure 11:
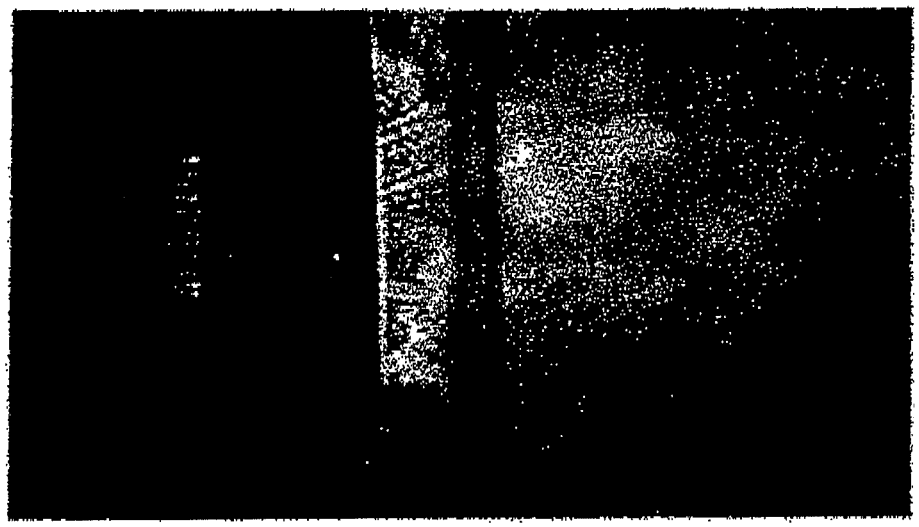
FIG. 11(a) is a picture of streak lines on a downstream side of the vortex generator to which the phase control plates of the first embodiment of the present invention are not attached.
FIG. 11(b) is a picture of streak lines on the downstream side of the vortex generator to which the phase control plates of the first embodiment of the present invention is attached.
Figure 11:
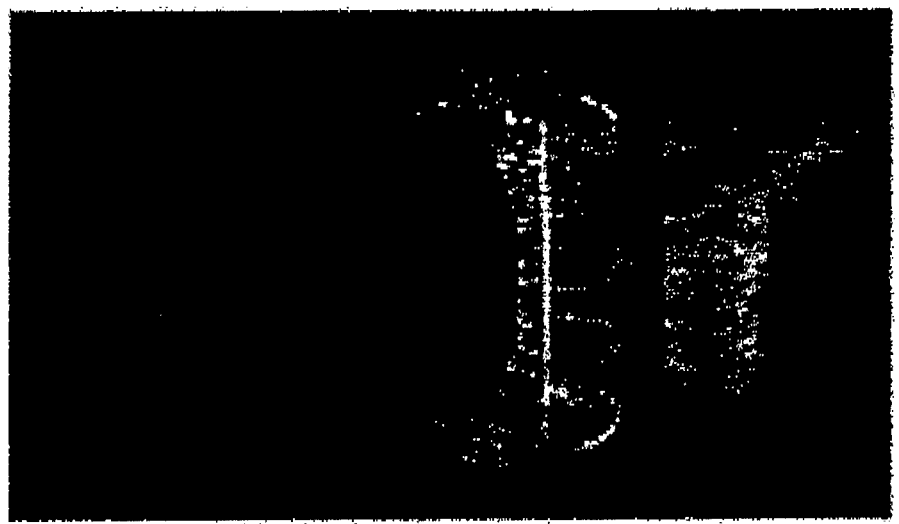
Figure 12:
FIG. 12(a) is a picture of streak lines, taken from a side of the vortex generator to which the phase control plates of the first embodiment of the present invention are not attached.
FIG. 12(b) is a picture of streak lines, taken from a side of the vortex generator to which the phase control plates of the first embodiment of the present invention is attached.
Figure 12:
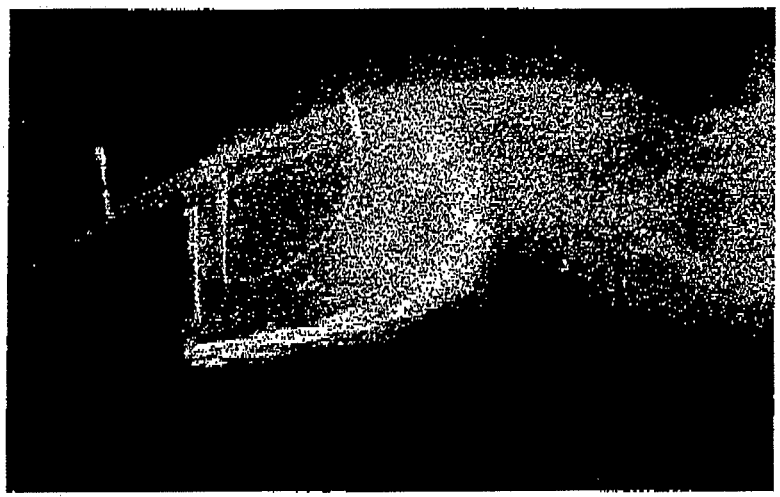

Action of the phase control plates 4 has been described thus far by reference to the test results. FIGS. 11 and 12 are pictures experimentally visualizing flows around the non-streamline wind tunnel body 2 equipped with the phase control plates 4. FIG. 11(a) shows a state of streak lines photographed from the downstream side of the vortex generator 2c when the wind tunnel body is not equipped with the phase control plates 4. It is seen that neatly-entered flows run into the back of the vortex generator 2; to thus generate vortexes. However, a state of the vortexes cannot be said to be clear. On the contrary, in the case of the wind tunnel body 2 equipped with the phase control plates 4 shown in FIG. 11(b), the streak lines are neatly regulated. A cluster of vortexes is understood to be formed on a right end side (the downstream side) of a space between two upper and lower transparent phase control plates 4. A center rod is for supporting purpose and is not relevant to the test.

FIG. 12(a) shows a state of streak lines photographed from a side of the ring-shaped vortex generator 2c when the wind tunnel body is not equipped with the phase control plates 4. Flows separate from each other along a top and a bottom of the phase control plate 4, whereby a vortex street is generated on a downstream side. FIG. 12(b) shows a state of streak lines photographed from the side of the ring-shaped vortex generator 2c when the wind tunnel body is equipped with the phase control plates 4. FIG. 12(b) shows drawing of intensive vortexes developing behind the wind tunnel body 2. An intensive, stable vortex street is ascertained to be formed on a downstream side.

Incidentally, the wind turbine, particularly, the structure of the wind power generator 1, has been described from the viewpoint of hydrodynamics but will be hereunder described from the viewpoint of an electric power generating system. As shown in FIG. 14, in the wind power generator 1 of the first embodiment, rotational force developing in the impeller 3 of the wind turbine is transmitted to the electric generator 11, thereby driving the electric generator 11 to generate electric power. Electricity is supplied to the outside. The wind turbine is not limited to a wind turbine equipped with an electric generator. Rotational force may also be directly output without involvement of the electric generator 11. For instance, although unillustrated, a rotary shaft is coupled as a driving motor to a drive shaft of a pump, to thus be utilized for pumping water. Alternatively, a gas is compressed and accumulated, thereby accumulating energy in an accumulator. Moreover, an agitator is driven, to thus heat water and be able to provide hot water. These are also wind turbines and correspond to fluid machine.

In the case of the wind power generator 1, rotational force of the impeller 3 is transmitted to the electric generator 11 provided in a power generating system 10 by way of the rotary shaft and a transmission mechanism as shown in FIG. 14, and the electric generator 11 generates electricity. For instance, an induction generator, or the like, is used for the electric generator 11. Since electricity generated by the electric generator 11 is AC power. The AC power is supplied to an AC/DC converter 12, where the power is converted into DC power. A battery 14 is charged with the thus-converted DC power by means of a battery charger 13. The battery 14 can be utilized as an emergency power source. The DC power from the AC/DC converter 12 is subjected to power control performed by a DC/AC converter 15, to thus again become predetermined power and converted into AC power. The AC power is sent as the AC power source to a power system 16. The above-described configuration of the power system 10 is a mere example and not limited to that mentioned above.

Operation of a controller 17 is now described. The number of rotations of the electric generator 11 is detected by means of a sensor that detects the number of rotations of a rotor of the electric generator. A gap detector 20 detects a gap between the impeller 3 and an inner circumferential surface of the wind tunnel body 2. The controller 17 determines, from the number of rotations, whether or not rotation is excessive. When rotation is determined to be excessive, an actuator 18 for decreasing an output is driven. The wind tunnel body 2 is actuated in a direction in which the gap becomes greater, to thus be moved to an optimum position in an axial direction. When excessive rotation is not yet solved, the number of rotations is decreased by a transmission mechanism 19 having a function of a change gear/clutch. Conversely, when the number of rotations of the impeller 3 is small, the actuator 18 controls the gap to an optimum gap that provides the maximum output. The gap affects aerodynamically-generated noise. When tip vortexes are fragmented and when the maximum output is obtained, noise can also be reduced. So long as the impeller 3 is given a variable pitch, the controller 17 can change the pitch during a gale of wind.

The actuator 18 is not an indispensable member. When the wind tunnel body 2 is not moved, an output can electrically be processed under output control of the controller 17. The wind tunnel body 2 is supported by a locking part 18a provided on a pillar of a support base 22, so as to be slidable in an axial direction of the impeller 3. The wind tunnel body 2 is axially slid by expansion and contraction of the actuator 18. When the wind tunnel body 2 is not moved, it is better to fix the wind tunnel body 2 to the pillar.

A voltage/current guided from the AC/DC converter 12 to the DC/AC converter 15 is detected as a voltage/current by means of an unillustrated voltage/current sensor. A detection signal is input to the controller 17. In accordance with the detection signal, the controller 17 controls the DC/AC converter 15, thereby performing operation so as to keep the voltage constant and unchanged. The thus-controlled power is supplied to the power system 16.

Incidentally, in the wind power generator 1 of the first embodiment, the support base 22 is set so as to be freely turnable with respect to a ground. The reason for this is that, by virtue of action of flows, fluid force acts on the wind turbine in a direction in which resistance is minimized, and the wind turbine rotates so as to face upwind at all times. Therefore, although the wind turbine of the first embodiment has such a simple configuration, the wind turbine can automatically be adjusted toward a direction where the maximum output is obtained. Since minute fluctuations also exist in flows, there may also be provided a mechanism for mechanically suppressing rotations due to fluctuations so as not to excessively follow the fluctuations, or the controller 17 may perform suppression function for inhibiting excessive following action.

Since the wind turbine of the first embodiment of the present invention is the wind power generator 1, rotational force of the impeller 3 is transmitted to the electric generator 11, whereupon the electric generator 11 is driven, to thus generate electric power and supply electricity to the outside. Flows for generating a vortex street are generated by use of the flows running inside and outside the wind tunnel body 2, and the flows are stably controlled, thereby increasing the velocity of the internal flows. Thus, high power electric generation can be carried out. The diffuser can be made shorter, so that the diffuser can be applied to micro wind turbines or mini-wind turbines having a length of meters or less. Further, the wind turbine can also be increased in size up to a wind turbine for a large wind power power generating system having megawatt-class power generation capability. High energy conversion efficiency can be obtained. The structure of the wind turbine system can also be reinforced. According to the method for increasing the velocity of the internal flow of the fluid machine of the first embodiment, flows for generating a vortex street can be made stable, and velocity of the internal flows can be increased by means of the flows on the outer side of fluid machine.

Second Embodiment

Figure 15:
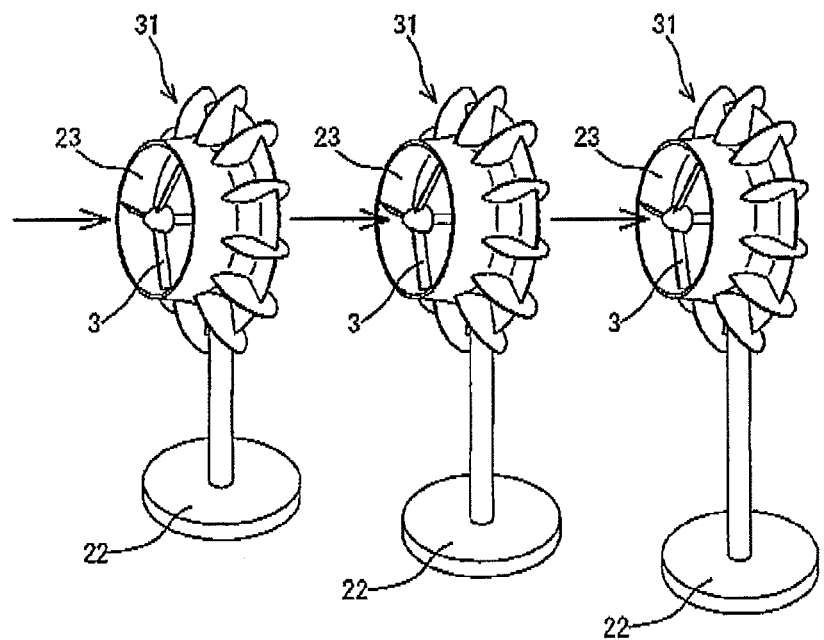
FIG. 15 is an external view of a tidal power generator according to a second embodiment of the present invention including a flanged casing having a rotating surface and a flange.

There is described fluid machine utilizing an unsteady flow of a second embodiment of the present invention; particularly, hydraulic machinery, such as a hydraulic turbine; and, more particularly, a tidal power generator capable of generating electricity by means of a tidal current. FIG. 15 is an external view of a tidal power generator according to a second embodiment of the present invention including a flanged casing having a rotating surface and a flange.

As shown in FIG. 15, a tidal power generator 31 has the support base 22 that is set on a seabed in a turnable manner and at a location where there are vehement ocean currents. A plurality of support bases are set in a row along a direction orthogonal to the main current. It is better to set height of impellers so as not to much experience the influence of a sea surface. When a direction of the ocean currents changes between high tide and low tide, the tidal power generators 31 can face by rotation toward the currents by virtue of action of the currents. Rotations of the tidal power generators may also be locked by the controllers 17 in order to prevent occurrence of bit-by-bit rotation. A configuration of each of the tidal power generators 31 is basically identical with that of the configuration of the wind power generator 1 shown in FIG. 14. A reference is made to FIG. 14 in connection with the configuration, and its detailed explanations are also identical with those provided by reference to FIG. 13. The descriptions about the wind tunnel body 2 of the first embodiment correspond to descriptions about the casing 23.

The tidal power generators 31 can be set by means of the support bases 22 suspended on the sea surface rather than being set on the seabed. Even the tidal power generators 31 may also be provided with the actuators 18, and the casing 23 may also be supported around each of the electric generators 11. Further, primary portions of the power generating system 10, the actuators 18, and the like, can also be set on the sea surface.

As mentioned above, since the fluid machine of the second embodiment of the present invention is the tidal power generators 31, the power generating system 10 is driven by rotational force of the impellers 3 generated by the tidal currents, to thus generate electric power, and electricity can be supplied to the outside. The fluid machine of the second embodiment also generates a vortex street two-dimensionally or three-dimensionally by use of flows running outside and inside of the casing 31. The flows are stably controlled, thereby increasing the velocity of an internal flow and enabling generation of high output electricity. Further, the casing 31 is also structurally reinforced.

In addition to aforementioned fluid machine, such as a wind turbine and hydraulic machinery, the method of the present invention for increasing the velocity of the internal flows of fluid machine utilizing unsteady flows can also be applied to another machines. For example, in a performance test system that tests performance of a jet engine in an atmosphere, a casing is attached to a position around a nacelle, and an internal rotor is rotated, whereby a quantity of wind taken into an air inlet of the jet engine can be increased. Even in such a case, a high performance test system is thereby obtained.

INDUSTRIAL APPLICABILITY

The present invention is applicable to fluid machine that operates in flows running inside and outside of a casing as in a wind power generator, a tidal power generator, and the like.

The invention claimed is:

1. A fluid machine which utilizes an unsteady flow, comprising:
   a non-streamline casing configured to form a vortex street on a downstream side from internal and external flows, wherein the casing includes an inlet and a throat having an internal diameter which is less than an internal diameter of the inlet, wherein a cross section of a flow passage from the inlet to the throat is gradually reduced; and
   an impeller disposed inside the casing at the throat,
   wherein the casing comprises a vortex generator configured to form the vortex street on the downstream side, the vortex generator is provided with a phase control structure configured to regulate, in a plane including a rear end face of the casing, a phase of a vortex formation that fluctuates along a circumferential direction within the plane including the rear end face, and configured to clarify a cell structure to be formed along the circumferential direction of the casing to fix, on a surface of the casing, positions of respective cells into a plurality of segmented regions arranged within the plane including the rear end face, and the phase control structure is configured to increase a velocity of the internal flow,
   wherein the phase control structure comprises phase control plates arranged on an outer circumference of the vortex generator such that each of the phase control plates straddles the vortex generator,
   wherein the phase control is arranged so as not to extend into an outlet of the casing.

2. The fluid machine according to claim 1, wherein the phase control structure is configured to regulate, in the plane including the rear end face of the casing, the phase of the vortex formation that fluctuates in the circumferential direction within the plane including the rear end face, is configured to clarify the cell structure to be formed along the circumferential direction of the casing to fix, on, the surface of the casing, the positions of the respective cells into the plurality of segmented regions arranged within the plane including the rear end face, is configured to shift on a segmented region basis a vortex generation dominant region among the segmented regions to which the cells are fixed, and is configured to increase the velocity of the internal flow.

3. The fluid machine according to claim 1, wherein the number of the phase control plates is the same as or an integral submultiple of the number of the cells of the cell structure spontaneously formed on the casing by the flow.

4. The fluid machine according to claim 1, wherein the number of the segmented regions formed by the phase control structure is the same as or an integral submultiple of the number of the cells of the cell structure spontaneously formed on the casing by the flow.

5. The fluid machine according to claim 1, wherein a power system is coupled to the impeller to convert a rotational force of the impeller into an electric force.

6. A wind turbine comprising:
   a non-streamline wind tunnel body configured to form a vortex street on a downstream side from internal and external atmospheric flows, wherein the casing includes an inlet and a throat having an internal diameter which is less than an internal diameter of the inlet, wherein a cross section of a flow passage from the inlet to the throat is gradually reduced; and
   an impeller disposed inside the wind tunnel body at the throat,
   wherein the wind tunnel body comprises a vortex generator configured to form the vortex street on the downstream side, the vortex generator is provided with a phase control structure which is configured to regulate, in a plane including a rear end face of the wind tunnel body, a phase of a vortex formation that fluctuates along a circumferential direction within the plane including the rear end face, and which is configured to clarify a cell structure to be formed along the circumferential direction of the wind tunnel body to fix, on a surface of the wind tunnel body, positions of respective cells into a plurality of segmented regions arranged in the circumferential direction, and the phase control structure is configured to increase a velocity of the internal flow,
   wherein the phase control structure comprises phase control plates arranged on an outer circumference of the vortex generator such that each of the phase control plates straddles the vortex generator,
   wherein the phase control structure is arranged so as not to extend into an outlet of the casing.

7. The wind turbine according to claim 6, wherein the phase control structure is configured to regulate, in the plane including the rear end face of the wind tunnel body, the phase of a vortex formation that fluctuates along the circumferential direction within the plane including the rear end face, is configured to clarify the cell structure to be formed along the circumferential direction of the wind tunnel body to fix, on the surface of the wind tunnel body, the positions of the respective cells into the plurality of segmented regions arranged in the circumferential direction, is configured to shift on a segmented region basis a vortex generation dominant region among the segmented regions to which the cells are fixed, and is configured to increase the velocity of the internal flow.

8. The wind turbine according to claim 6, wherein the number of the phase control plates is the same as or an integer submultiple of the number of the cells of the cell structure spontaneously formed on the wind tunnel body by the flow.

9. The wind turbine according to claim 6, wherein the vortex generator configured to form the vortex street comprises a ring-shaped flange disposed on a downstream end of the wind tunnel body.

10. The wind turbine according to claim 6, wherein a power system is coupled to the impeller to convert a rotational force of the impeller into an electric force.

11. A method for increasing a velocity of an internal flow of a fluid machine, that includes a non-streamline casing, wherein the casing includes an inlet and a throat having an internal diameter which is less than an internal diameter of the inlet, wherein a cross section of a flow passage from the inlet to the throat is gradually reduced, an impeller disposed inside the casing at the throat, and a vortex generator located on a rear end of the casing, comprising:

forming a vortex street from internal and external flows on a downstream side when the internal and external flows run inside and outside the non-streamline casing; and
increasing the velocity of the internal flow running through the casing by reducing pressure on the downstream side due to the forming of the vortex street; and
regulating, in a plane including a rear end face of the non-streamline casing, a phase of a vortex formation that fluctuates along a circumferential direction within the plane including the rear end face, and clarifying a cell structure to be formed in the circumferential direction of the casing to fix, on a surface of the casing, positions of respective cells into a plurality of segmented regions arranged within the plane including the rear end face and to stabilize the flow, wherein the velocity of the internal flow is increased due to the stabilization, wherein the phase control structure comprises phase control plates arranged on an outer circumference of the vortex generator such that each of the phase control plates straddles the vortex generator, wherein the phase control structure is arranged so as not to extends into an outlet of the casing.

12. The method according to claim 11, further comprising stabilizing a shift of a vortex generation dominant region that corresponds to the cell in which the vortex is formed by performing the shift on a segmented region basis, wherein the velocity of the internal flows is increased due to the stabilizing.

13. The method according to claim 11, wherein the segmented regions are made uniform to allow every segmented region to be the vortex generation dominant region.

* * * * *